United States Patent

Urry et al.

[15] 3,676,469

[45] July 11, 1972

[54] PROCESS FOR THE PREPARATION OF HALOGENATED ESTERS

[72] Inventors: Wilbert H. Urry, Chicago, Ill.; Hsien Ying Niu, Southgate, Mich.

[73] Assignee: Wyandotte Chemicals Corporation, Wyandotte, Mich.

[22] Filed: Dec. 12, 1968

[21] Appl. No.: 783,437

Related U.S. Application Data

[63] Continuation-in-part of Ser. No. 551,555, May 20, 1966, abandoned.

[52] U.S. Cl. .................................. 260/408, 71/92, 71/94, 71/95, 71/106, 71/107, 260/268 SY, 260/293.81, 260/295 R, 260/326.3, 260/347.5, 260/468 R, 260/469, 260/473 R, 260/473 S, 260/474, 260/476 R, 260/484 R, 260/486 H, 260/487, 260/494, 260/633, 260/999
[51] Int. Cl. ...................................... C07c 67/00, C09f 5/00
[58] Field of Search ............... 260/426, 494, 633, 469, 488 F, 260/408, 468, 476

[56] References Cited

UNITED STATES PATENTS 3,189,656  6/1965  Gordon et al. ..........................260/488

OTHER PUBLICATIONS

Chemical Abstracts, 64:19394 h– 19395 d.

*Primary Examiner*—Vivian Garner
*Attorney*—Joseph D. Michaels, Cedric H. Kuhn, Robert E. Dunn, Bernhard R. Swick, Charles G. Lamb and Gerard G. Weil

[57]        ABSTRACT

Halogenated esters are prepared by the free-radical initiated reaction of aldehydes with certain halogenated ketones. The esters have selective pesticidal activity and possess surface active properties.

5 Claims, No Drawings

PROCESS FOR THE PREPARATION OF HALOGENATED ESTERS

The present application is a continuation-in-part of patent application Ser. No. 551,555 filed May 20, 1966, now abandoned.

The present invention relates to novel halogenated esters and to a process for the preparation thereof. More particularly, the invention relates to the free-radical initiated reaction of aldehydes with certain halogenated ketones and to the novel esters prepared thereby. The novel esters of the present invention are useful intermediates in the preparation of flame-retardant polymers, have selective pesticidal activity, and alcohols derived from these esters may be oxyalkylated to yield surface active agents.

In accordance with the present invention, it has been determined that in the presence of a free-radical initiator aldehydes react with certain fluorinated ketones to yield novel esters. It appears that in the presence of free-radical initiators the intermediate acyl radical derived from the aldehyde adds to the carbonyl oxygen atom of the ketone, resulting in the novel esters of the present invention.

The novel esters of the present invention may be represented by the formula:

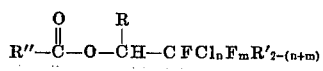

wherein

R is a saturated aliphatic radical having from 1 to 20 carbon atoms, an aromatic radical having from six to 12 carbon atoms, a cycloaliphatic radical having from five to eight carbon atoms, or $CFCl_nF_mR'_{2-(n+m)}$, R' and R'' are, independently, hydrogen, a saturated aliphatic radical having from 1 to 20 carbon atoms, an aromatic radical having from 6 to 12 carbon atoms, or a cycloaliphatic radical having from five to eight carbon atoms, and $n$ and $m$ are numbers from 0 to 2, the total of ($n + m$) being from 0 to 2. These esters are prepared by the free-radical initiated reaction of aldehydes of the formula:

with ketones of the formula:

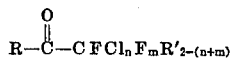

wherein R, R', R'', $n$ and $m$ are as defined above.

Aldehydes which may be employed in the preparation of the esters of the present invention include saturated aliphatic aldehydes having from 1 to 20 carbon atoms such as formaldehyde, butyraldehyde, heptaldeyde, glyoxal, nonylaldehyde, decylaldehyde, dodecylaldehyde and octadecylaldehyde; aromatic aldehydes having from 6 to 12 carbon atoms such as benzaldehyde, naphthaldehyde, benzylaldehyde and 9-anthraldehyde; saturated cycloaliphatic aldehydes having from five to eight carbon atoms such as cyclohexyl aldehyde, cyclopentylaldehyde, aliphatic aldehydes such as hydroxylacetaldehyde, trichloroacetaldehyde, 5-hydroxypentanal, dimethoxyheptaldehyde, citral and 2-phenylpropionaldehyde; substituted aromatic aldehydes such as tolylaldehyde, α-tolualdehyde, xylylaldehyde, cinnamaldehyde, salicylaldehyde, anisaldehyde, p-chlorobenzaldehyde, dimethoxybenzaldehyde, mesitaldehyde and vanillin; substituted saturated cycloaliphatic aldehydes such as chlorocyclohexylaldehyde; and saturated and unsaturated, substituted and unsubstituted heterocyclic aldehydes such as furfural, 1-benzyl-4-formyl-4-phenyl-piperidine, N-formylpiperidine, 5-hydroxymethyl furfural, 6-methyl-2-pyridinecarboxaldehyde and pyrrol-2-carboxaldehyde. Mixtures of any of the above aldehydes may also be employed in the present invention.

It is apparent that the particular aldehyde employed in the preparation of the esters of the invention is not critical. Any aldehyde will be operable. The preferred aldehydes are the saturated aliphatic aldehydes such as butyraldehyde and heptaldehyde and the aromatic aldehydes such as benzaldehyde and anisaldehyde.

The ketones which may be employed in the preparation of the esters of the present invention are those corresponding to the formula:

wherein R, R', $n$ and $m$ are as defined above. It is apparent that the ketones employed in the invention must contain at least one fluorine atom attached to the α-carbon atom. Representative compounds include:
hexafluoroacetone
1,1,1,3,3-pentafluoro-3-chloroacetone
1,1,3,3-tetrafluoro-1,3-dichloroacetone
1,1,3-trifluoro-1,3,3-trichloroacetone
1,1,1-trifluoroacetone
1,3-difluoroacetone
1-fluoroacetone
1,1,1-trifluoroacetophenone
1,1-difluoro-1-ethylacetophenone
2,2,4,4-tetrafluoro-3-pentanone
1,1,3,3-tetrafluoro-1-phenyl-2-butanone
3,3-difluoro-1-phenyl-2-butanone
1,1,1-trifluoro-3-vinylacetone
1,1,1-trifluoro-3-piperazinylacetone As is apparent, a variety of ketones may be employed in the preparation of the esters of the present invention. The critical characterization of the operable ketones is the presence of at least one fluorine atom on the carbon atom which is adjacent to the carbonyl group. Without the fluorine atom so present, efficient free-radical addition resulting in ester formation does not occur. The preferred ketones are those having at least three fluorine atoms such as hexafluoroacetone, 1,1,3,3-pentafluoro-3-chloroacetone, 1,1,3,3-tetrafluoro-1,3-dichloroacetone and 1,1,1-trifluoroacetone.

The following compounds serve to illustrate the novel esters of the present invention:
1,1,1,3,3,3-hexafluoro-2-propyl butanoate
1,1,1,3,3,3-hexafluoro-2-propyl heptanoate
1,1,1,3,3,3-hexafluoro-2-propyl crotonoate
1,1,1,3,3,3-hexafluoro-2-propyl benzoate
1,1,1,3,3,3-hexafluoro-2-propyl salicylate
1,1,1,3,3-pentafluoro-3-chloro-2-propyl butanoate
1,1,1,3,3-pentafluoro-3-chloro-2-propyl p-methoxybenzoate
1,1,1,3,3-pentafluoro-3-chloro-2-propyl acrylate
1,1,3,3-tetrafluoro-1,3-dichloro-2-propyl butanoate
1,1,3,3-tetrafluoro-1,3-dichloro-2-propyl heptanoate
1,1,3,3-tetrafluoro-1,3-dichloro-2-propyl benzoate
1,1,3-trifluoro-1,3,3-trichloro-2-propyl butanoate
1,1,3-trifluoro-1,3,3-trichloro-2-propyl heptanoate
1,3-difluoro-2-propyl acetate
2-(1-fluoromethylcarbethoxy)furan
1,1,1-trifluoro-2-phenyl ethylformate
2,2,4,4-tetrafluoro-3-pentyl toluate
1,1,1-trifluoro-3-piperazinyl-2-propyl caproate As is apparent from the above brief list of compounds, many possible novel esters may be prepared in accordance with the present invention.

In a preferred embodiment of the present invention, aliphatic aldehydes are employed as a reactant. It has been determined that when aliphatic aldehydes react with fluorinated ketones, both esters and alcohols are obtained. It appears that the aliphatic radical from decarbonylation of the aldehyde adds exclusively to the carbonyl carbon atom resulting in the preparation of a halogenated alcohol. This addition does not occur when aromatic or α,β-unsaturated aldehydes are reacted with ketones. Example I, below, demonstrates the process of the invention when both an alcohol and an ester are prepared.

The amounts of aldehyde and ketone which may be employed in the process of the present invention may vary considerably. Generally, an equimolar ratio of aldehyde to ketone will be employed, although, if desired, an excess amount of either reactant may be employed.

The preparation of the esters in accordance with the present invention requires the presence of a free-radical initiator. Any standard well-known, free-radical initiator may be employed, preferably peroxides such as hydrogen peroxide, t-butyl peroxide, di-t-butyl peroxide, benzoyl peroxide, butyl hydroperoxide and dicumyl peroxide, and azo compounds such as azobisisobutyronitrile. Other peroxide initiators which may be employed in the present invention include cumene hydroperoxide, dichloro-benzoyl peroxide, tertiary butyl perbenzoate, acetyl benzoyl peroxide, caprylyl peroxide, lauryl peroxide, hydroxyheptyl peroxide, methyl ethyl ketone peroxide, 1-hydroxycyclohexyl hydroperoxide-1, ditertiary butyl perphthalate, dibenzaldiperoxide, tertiary butyl peroxide, 2,2-(tertiary butylperoxy) butane, bis(parabromobenzoyl)peroxide, bis(para-chlorobenzoyl) peroxide, bis(succinyl)peroxide, and bis(chloroacetyl)peroxide, as well as said peroxide catalysts compounded with other compounds such as benzoyl peroxide compounded with tricresyl phosphate, benzoyl peroxide compounded with dibutyl phthalate, methyl ethyl ketone peroxide in dimethyl phthalate, and cyclohexanone peroxide compounded with dibutyl phthalate. Reference is made to a book entitled Radical Polymerization by J. C. Bevington, (Academic Press, 1961), pages 5–28, for a detailed discussion of well-known free-radical initiators which may be employed in the present invention. Generally, from about 0.5 part to about 10 parts of initiator per 100 parts of aldehyde will be employed.

The esters of the invention are generally prepared by the reaction of an aldehyde with a ketone at temperatures between about 50° C. and 200° C., preferably between 70° C. and 150° C. Although the reaction may be conducted at atmospheric pressure, the physical nature of the reactants allows for conducting the reaction in a sealed container, and thus pressure may and generally will develop. The time of the reaction will vary, depending upon the temperature, the pressure, and the selected initiator. Generally, however, from 4 hours to 16 hours, preferably from 6 hours to 12 hours, will be sufficient time to assure that the reaction is completed. After the reaction is completed, the ester and alcohol, if any is obtained, may be separated from the reaction product by any standard procedure such as distillation. In the aforementioned preferred embodiment of the invention, distillation of the reaction product will yield two separate fractions; one being an ester and the other an alcohol.

If desired, various solvents, inert to the reactants and to the products, may be used. Illustrative solvents are benzene and the saturated hydrocarbons.

The esters of the present invention possess pesticidal activity. Specifically, the esters prepared from 1,1,3,3-tetrafluoro-1,3-dichloroacetone and 1,1,3-trifluoro-1,3,3-trichloroacetone demonstrate selective activity as herbicides and insecticides. Moreover, the esters of the present invention possess surface active properties. Esters prepared from aromatic aldehydes such as benzaldehyde and aliphatic aldehydes such as heptaldehyde demonstrate utility in lowering the surface tension of water.

The following examples serve to illustrate the invention. All parts are by weight unless otherwise stated.

EXAMPLE I

A sealed reaction vessel equipped with a thermometer, a stirrer, a pressure gage, an inlet valve, and a heat exchange means was charged with 5 parts of benzoyl peroxide in 75 parts of butyraldehyde. The charge was cooled to −80° C. and 78 parts of hexafluoroacetone was distilled into the vessel. Heat was then applied to the charge, bringing it to a temperature of 85° C., at which temperature the charge was maintained for about 11 hours. Distillation of the product resulted in an 83 percent yield, 95.1 parts of 1,1,1,3,3,3-hexafluoro-2-propyl butanoate and a 10.4 percent yield, 10.2 parts of 1,1,1-trifluoro-2-(trifluoromethyl)-2-pentanol. The structure of the products was confirmed from their nuclear magnetic resonance spectra, from their mass spectra, and from the identification of their derivatives. The butanoate ester, a colorless liquid, is characterized by a boiling point of 107° C., an $n^{20}_D$ of 1.3,204 and a molecular weight of 238. The ester is effective in lowering the surface tension of water thus exhibiting utility as a surface active agent. The pentanol, a colorless liquid, is characterized by a boiling point of 98° C., an $n^{20}_D$ of 1.3,299 and a molecular weight of 210.

EXAMPLE II

Following the procedure of Example I, 72 parts of butyraldehyde and 46 parts of 1,1,1,3,3-pentafluoro-3-chloracetone were heated to 70° C. in the presence of 4 parts of azobisisobutyronitrile and maintained at this temperature for 8 hours. Distillation of the product resulted in a 63 percent yield of 1,1,1,3,3-pentafluoro-3-chloro-2-propyl butanoate and a 15 percent yield of 1,1,1-trifluoro-2-(difluorochloromethyl)-2-pentanol. The butanoate ester, a colorless liquid, is characterized by a boiling point of 132° C., an $n^{20}_D$ of 1.3,517 and a molecular weight of 254. The ester is effective in lowering the surface tension of water thus exhibiting utility as a surface active agent. The pentanol, a colorless liquid, is characterized by a boiling point of 127° C., an $n^{20}_D$ of 1.3,672 and a molecular weight of 228.

Ester Analysis:

| | |
|---|---|
| Calculated for $C_7H_8O_2F_5Cl$: | C, 33.0; H, 3.2; F, 37.3; Cl, 13.9 |
| Found: | C, 33.0; H, 3.5; F, 37.6; Cl, 13.9 |

EXAMPLE III

Following the procedure of Example I, 72 parts of butyraldehyde and 61 parts of 1,1,3,3-tetrafluoro-1,3-dichloroacetone were heated to 85° C. in the presence of 5 parts of benzoyl peroxide and maintained at this temperature for 12 hours. Distillation of the product resulted in a 97 percent yield, 81.1 parts of 1,1,3,3-tetrafluoro-1,3-dichloro-2-propyl butanoate. The product, a colorless liquid, is characterized by a boiling point of 162° C., an $n^{20}_D$ of 1.3,511 and a molecular weight of 272. The product exhibits activity as a herbicide and is effective in lowering the surface tension of water.

Product Analysis:

| | |
|---|---|
| Calculated for $C_7H_8O_2F_4Cl_2$: | C, 31.0; H, 3.1; Cl, 26.2; F, 28.0 |
| Found: | C, 31.2; H, 3.1; Cl, 25.0; F, 27.8 |

EXAMPLE IV

Following the procedure of Example I, 36 parts of butyraldehyde and 35 parts of 1,1,3-trifluoro-1,3,3-trichloroacetone were heated to 85° C. in the presence of 2.5 parts of benzoyl peroxide and maintained at this temperature for 12 hours. Analysis indicated that the product obtained is 1,1,3-trifluoro-1,3,3-trichloro-2-propyl butanoate.

EXAMPLE V

Following the procedure of Example I, 50 parts of heptaldehyde and 36.5 parts of hexafluoroacetone were heated to 85° C. in the presence of 3 parts of benzoyl peroxide and maintained at this temperature for 12 hours. Analysis indicated that the ester obtained is 1,1,1,3,3,3-hexafluoro-2-propyl heptanoate, a colorless liquid characterized by a boiling point of 162° C., an $n^{20}{}_D$ of 1.3,523 and a molecular weight of 280. The ester is effective in lowering the surface tension of water thus exhibiting utility as a surface active agent. Minor amounts of 1,1,1-trifluoro-2-(trifluoromethyl)-2-octanol were also obtained. This alcohol had a boiling point of 157° C. and an $n^{20}{}_D$ of 1.3,651.

EXAMPLE VI

Following the procedure of Example I, 50 parts of heptaldehyde and 71 parts of 1,1,1,3,3-pentafluoro-3-chloroacetone were heated to 85° C. in the presence of 3 parts of benzoyl peroxide and maintained at this temperature for 12 hours. Analysis indicated that the product obtained (68 percent yield) was 1,1,1,3,3-pentafluoro-3-chloro-2-propyl heptanoate, a colorless liquid characterized by a boiling point of 187° C., an $n^{20}{}_D$ of 1.3,763 and a molecular weight of 298. The ester is effective in lowering the surface tension of water thus exhibiting utility as a surface active agent.

EXAMPLE VII

Following the procedure of Example I, 50 parts of heptaldehyde and 61 parts of 1,1,3,3-tetrafluoro-1,3-dichloroacetone were heated to 85° C. in the presence of 3 parts of benzoyl peroxide and maintained at this temperature for 12 hours. Analysis indicated that the product obtained (65 percent yield) was 1,1,3,3-tetrafluoro-1,3-dichloro-2-propylheptanoate, a colorless liquid characterized by a boiling point of 216° C., an $n^{20}{}_D$ of 1.4,009 and a molecular weight of 314. The product exhibits activity as a herbicide and is effective in lowering the surface tension of water.

EXAMPLE VIII

Following the procedure of Example I, 57 parts of heptaldehyde and 34 parts of 1,1,3-trifluoro-1,3,3-trichloroacetone were heated to 85° C. in the presence of 1 part of t-butyl peroxide and maintained at this temperature for 12 hours. Analysis indicated that the product obtained was 1,1,3-trifluoro-1,3,3-trichloro-2-propylheptanoate.

EXAMPLE IX

Following the procedure of Example I, 76 parts of benzaldehyde and 58 parts of hexafluoroacetone were heated to 85° C. in the presence of 5 parts of benzoyl peroxide and maintained at this temperature for 12 hours. The product was cooled to −50° C. and a 97 percent yield of 1,1,1,3,3,3-hexafluoro2-propylbenzoate, a colorless solid, was obtained. The product has a melting point of 53.9° C. The ester is effective in lowering the surface tension of water thus exhibiting utility as a surface active agent.

Product Analysis:

| | |
|---|---|
| Calculated for $C_{10}H_6F_6O_2$: | C, 44.1; H, 2.2; F, 41.9; |
| Found: | C, 44.4; H, 2.4; F, 41.7; |

EXAMPLE X

Following the procedure of Example I, 54 parts of benzaldehyde and 45 parts of 1,1,1,3,3-pentafluoro-3-chloroacetone were heated to 85° C. in the presence of 3 parts of benzoyl peroxide and maintained at this temperature for 12 hours. Analysis indicated that the product obtained (91 percent yield) was 1,1,1,3,3-pentafluoro-3-chloro-2-propylbenzoate, a colorless solid characterized by a boiling point of 203° C. and a melting point of 35.8° C. to 35.9° C. The ester is effective in lowering the surface tension of water thus exhibiting utility as a surface active agent.

Product Analysis:

| | |
|---|---|
| Calculated for $C_{10}H_6F_5Cl$: | C, 41.6; H, 2.1; F, 32.9; Cl, 12.3 |
| Found: | C, 41.3; H, 2.0; F, 32.6; Cl, 12.2 |

EXAMPLE XI

Following the procedure of Example I, 60 parts of benzaldehyde and 56 parts of 1,1,3,3-tetrafluoro-1,3-dichloroacetone were heated to 85° C. in the presence of 3 parts of benzoyl peroxide and maintained at this temperature for 12 hours. Analysis indicated that the product obtained (100 percent yield) was 1,1,3,3-tetrafluoro-1,3-dichloro-2-propylbenzoate, a colorless liquid characterized by a boiling point of 233° C. and an $n^{20}{}_D$ of 1.4,632. The product exhibits activity as a herbicide and is effective in lowering the surface tension of water.

Product Analysis:

| | |
|---|---|
| Calculated for $C_{10}H_6F_4Cl_2$: | C, 39.4; H, 2.0; F, 24.9; Cl, 23.2 |
| Found: | C, 40.0; H, 2.0; F, 26.7; Cl, 23.7 |

EXAMPLE XII

Following the procedure of Example I, 54 parts of dodecylaldehyde and 25 parts of hexafluoroacetone were heated to 85° C. in the presence of 5 parts of benzoyl peroxide and maintained at this temperature for 15 hours. Analysis indicated that the product obtained (60 percent yield) was 1,1,1,3,3,3-hexafluoro-2-propyl dodecanoate, a colorless liquid characterized by a boiling point of 62° C. at 0.05 mm of mercury. The product exhibited ability to emulsify water in mineral oil.

EXAMPLE XIII

Following the procedure of Examine I, 40 parts of dodecylaldehyde and 54 parts of 1,1,3,3-tetrafluoro-1,3-dichloroacetone were heated to 85° C. in the presence of 1 part of benzoyl peroxide and maintained at this temperature for 15 hours. Analysis indicated that the product obtained (~80 percent yield) was 1,1,3,3-tetrafluoro-1,3-dichloro-2-propyl dodecanoate, a colorless solid. The product exhibits activity as a herbicide.

What is claimed is:

1. A process for the preparation of esters of the formula:

wherein
R is an alkyl radical having from 1 to 20 carbon atoms, a hydrocarbon aryl radical having from 6 to 12 carbon atoms, a cycloalkyl radical having from five to eight carbon atoms, or $CFCl_nF_mR'_{2-(n+m)}$, R' and R'' are, independently, hydrogen, an alkyl radical having from 1 to 20 carbon atoms, a hydrocarbon aryl radical having from 6 to 12 carbon atoms, or a cycloalkyl radical having from five to eight carbon atoms, and n and m are numbers from 0 to 2, the total of (n + m) being from 0 to 2, which comprises contacting, in the presence of a free-radical initiator at temperatures between 50° C. and 200° C. for 4 hours to 16 hours, an aldehyde of the formula:

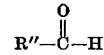

with a ketone of the formula:

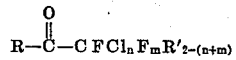

wherein R, R', R'', n and m are as defined above.

2. The process of claim 1 wherein the free-radical initiator is a peroxy compound.

3. The process of claim 1 wherein R'' is an alkyl radical having from 1 to 20 carbon atoms.

4. The process of claim 1 wherein the ketone is of the formula:

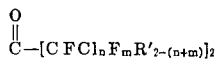
wherein R', n and m are as defined in claim 1.
5. The process of claim 1 wherein the ketone is hexafluoroacetone, 1,1,1,3,3-pentafluoro-3-chloroacetone, 1,1,3,3-tetrafluoro-1,3-dichloroacetone, 1,1,3-trifluoro-1,3,3-trichloro acetone or 1,1,1-trifluoroacetone.
* * * * *